United States Patent [19]

Sasaki et al.

[11] Patent Number: 4,910,481
[45] Date of Patent: Mar. 20, 1990

[54] BRANCHING FILTER

[75] Inventors: Kanemi Sasaki, Tokyo; Sadao Ogawa, Hussa; Mikio Takano, Oume; Kennzo Urabe, Akishima, all of Japan

[73] Assignee: Kokusai Denki Kabushiki Kaisha, Tokyo, Japan

[21] Appl. No.: 282,598

[22] Filed: Dec. 12, 1988

[30] Foreign Application Priority Data

Mar. 7, 1988 [JP] Japan .................................. 63-54540

[51] Int. Cl.$^4$ ............................................... H03H 7/46
[52] U.S. Cl. ...................................... 333/134; 370/24; 455/73
[58] Field of Search ................. 333/126, 129, 132–135; 455/73, 78–82; 370/24, 32, 37

[56] References Cited

U.S. PATENT DOCUMENTS

| | | | |
|---|---|---|---|
| 2,167,522 | 7/1939 | Nitz | 333/132 |
| 2,965,752 | 12/1960 | Medford et al. | 333/126 X |
| 3,124,768 | 3/1964 | Tilston | 333/126 |

Primary Examiner—Paul Gensler
Attorney, Agent, or Firm—David O'Reilly

[57] ABSTRACT

A branching filter for separating or combining two different frequencies without interference in radio communication equipment etc. One or both of two filter blocks for separating or combining two signal waves whose central frequency differ from each other are constructed from a dielectric bandpass filter which allows the desired wave of a block to pass and a SAW band stop filter being connected in series with said filter which allows the desired wave of a block to pass and stops passing of the desired wave of another block.

2 Claims, 4 Drawing Sheets

BRANCHING FILTER

FIELD OF THE INVENTION

This invention relates to a branch filter for separating or combining two signals with different frequencies in order to get rid of interference in radio communication equipment and the like.

BACKGROUND OF THE INVENTION

Heretofore, there are two methods used in branching filters for mobile telephones in the 800 MHz band area.

In the first method, as shown in FIG. 4, an input signal from antenna 1 is fed through branching circuit 2, which is a transmission line composed from a coil and a condenser or the like, to receiver di-electric bandpass filter 11 consisting of high di-electric loss ceramic material having an elimination band area at the transmitting frequency zone. The output signal Rx from filter 11 is fed to a receiver. A transmitting signal Tx is fed to a similar di-electric bandpass filter 10 having an elimination band area at the receiving frequency zone and to antenna 1 through branching filter 2. However, filters 10, 11 must be large to satisfy the required characteristics of insertion loss and damping factor from the method used in communication equipment because these filters 10, 11 are cubic cavity resonators. That is, the ratio of the damping factor determines the necessary sections of a resonator and the allowable insertion loss of a bandpass filter determines the capacity of the resonators. In branching filters presently used, the insertion loss of di-electric bandpass filter 11 at the transmitting side is 3 dB, and the insertion loss of di-electric bandpass filter 10 at the receiving side is 2 dB.

In a second method, shown in FIG. 5, branching filter 2 is a combination of a receiving side SAW (Surface Acoustic Wave) bandpass filter 7, 9 having a damping characteristic curve as shown in FIG. 6(a) and a transmitting side SAW band stop filter 6 having a damping characteristic curve shown in FIG. 6(b). The bandpass insertion loss of SAW bandpass filters 7, 9 at the receiving side are 4–6 dB, and the bandpass insertion loss of SAW band stop filter 6 at the transmitting side is 1.5–2 dB.

This method has a further disadvantage over the first method because losses at filters 7, 9 result in a lower noise function of the receiver. Therefore, in the second method, to relieve this disadvantage, amplifier 8 having a low noise and high gain GaAs FET transistor (Gallium Arsenide Field Effect Transistor) must be interposed between filters 7, 9.

However, while a GaAs FET transistor is better under lower voltage operation than a bipolar transistor, it consumes large amounts of electric current. Therefore, this type of branching filter is a disadvantage for portable communication machines which require low consuming current.

Moreover, while a SAW filter is small, such as 0.2 cc, it needs a low noise amplifier 8 in the receiving circuit, and additional circuits, such as a bias circuit and a matching circuit, hinder heat radiation of SAW filter 6 at the receiving side, and the second method requires 70–80% of the volume of the first method.

BRIEF DESCRIPTION OF THE INVENTION

This invention is intended to eliminate the drawbacks of these two previous methods. One object of this invention is to provide a branching filter small in size and high in quality by combining a low loss SAW filter and di-electric bandpass filter utilizing the non-symmetric characteristic of a branching filter.

Another object of this invention is to provide a branching filter having one or both of two filter blocks $FB_1$, $FB_2$, for separating or combining two signal waves $R_x$, $T_x$ whose central frequency differs from each other. The filter blocks are comprised of di-electric bandpass filters 4, 5 in series with SAW band stop filters 3, 6 respectively which pass the desired wave of the respective filter block while stopping the desired wave of the other respective filter block.

The above and other objects, advantages and novel features of this invention will be fully understood from the following detailed description and the accompanying drawings, in which like reference numbers indicate like or similar parts throughout wherein;

DETAILED DESCRIPTION OF THE INVENTION

Figure 1:
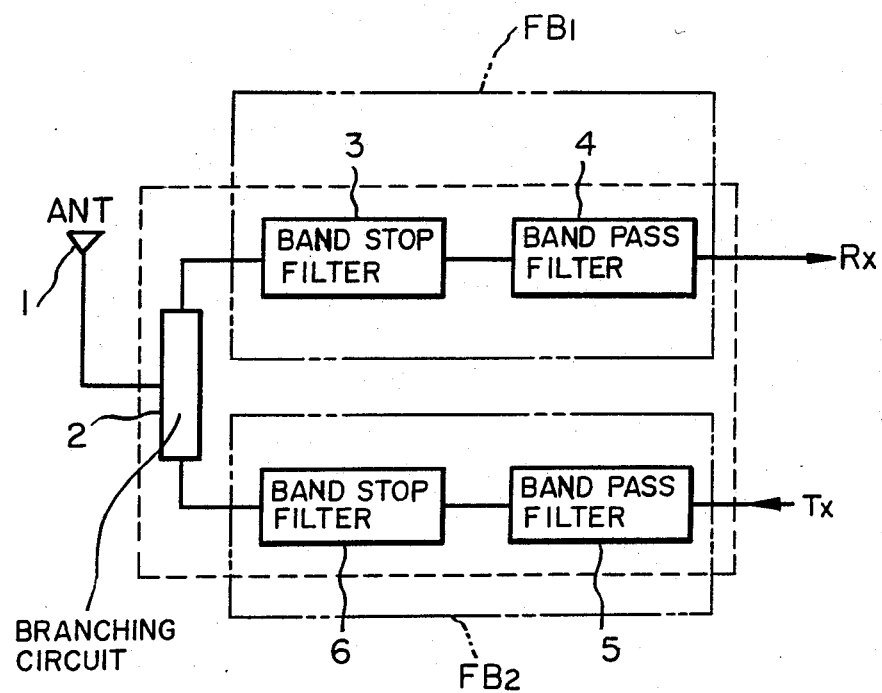
FIG. 1 shows a circuit of an embodiment for a branching filter according to this invention.

FIG. 1 shows a circuit for one embodiment of a branching filter according to this invention. Branching circuit 2 is connected to antenna 1 and is a transmission line or composed of a coil and a condenser or the like. SAW band stop filter 3 is connected to branching circuit 2 and has an elimination band area in the transmitting frequency zone. Di-electric bandpass filter 4 is connected to filter 3 in series. Filter 3 and di-electric bandpass filter 4 constitute the receiving side filter block $FB_1$. Di-electric bandpass filter 4 is a self block, i.e. allows only passing the desired signal (received signal) of filter block $FB_1$ and outputs a received signal Rx. Di-electric bandpass filter 5 receives input transmitting signal Tx and allows only the desired wave to pass. SAW band stop filter 6 is connected for receiving the output of filter 5 and has an elimination band area in the receiving frequency zone. Di-electric bandpass filter 5 and SAW band stop filter 6 constitute the receiving side filter block $FB_2$.

A signal input from antenna 1 is fed through branching circuit (i.e. transmission line or composed from a coil and a condenser or the like) to SAW band stop filter 3 having an elimination band area and di-electric bandpass filter 4 which resonates with the receiving frequency and the desired received signal $R_x$ is fed to a receiver.

On the other hand, transmitting signal $T_x$ is fed through the di-electric bandpass filter 5 which resonates with the transmitting frequency and SAW band stop filter 6 having an elimination band area in the receiving frequency zone, to branching circuit 2 and is output to antenna 1.

Figure 6A:
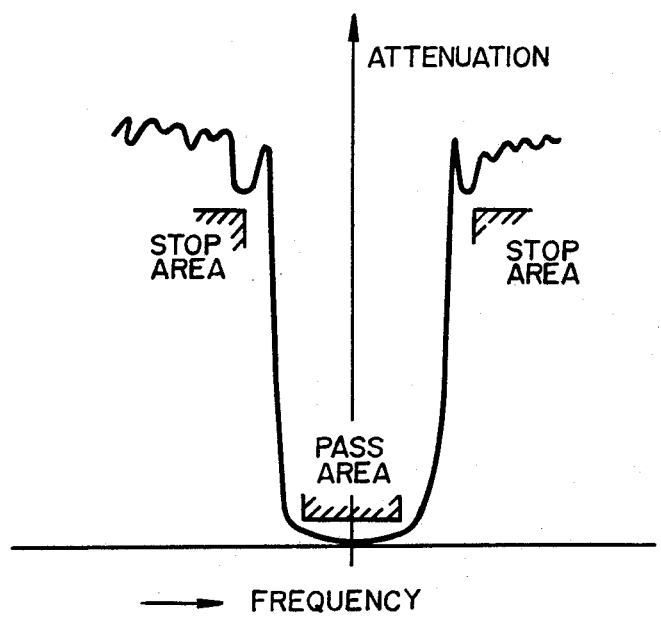
FIGS. 6(a) and 6(b) show the attenuation characteristic curves of a di-electric bandpass filter and a SAW stop filter for prior art filters respectively.
Figure 6B:
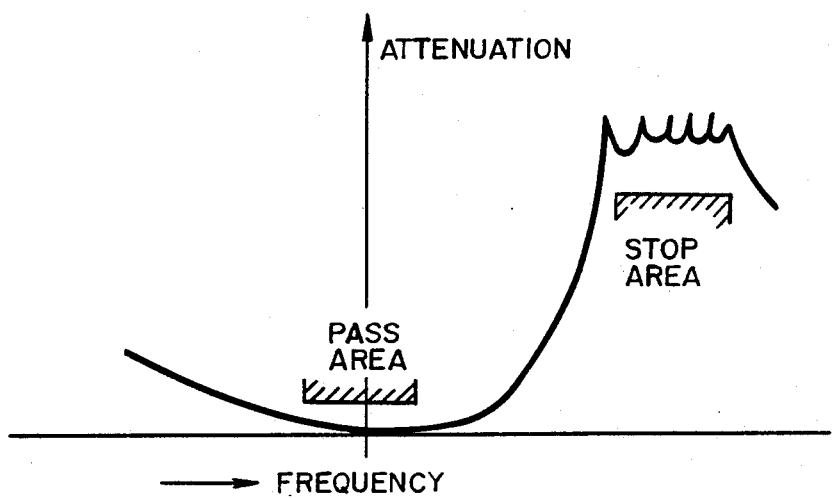

FIG. 6(b) shows the damping characteristic for a SAW (Surface Acoustic Wave) stop filter generally (as reported in Electronic Information Communication Academic Society, US, 87-17, July 1987) for an 800 MHz area portable telephone which is suitable for use as the SAW stop filters 3, 6 in the invention and for a SAW stop filter connected in series with a resonator used in a SAW branching filter.

Figure 2:
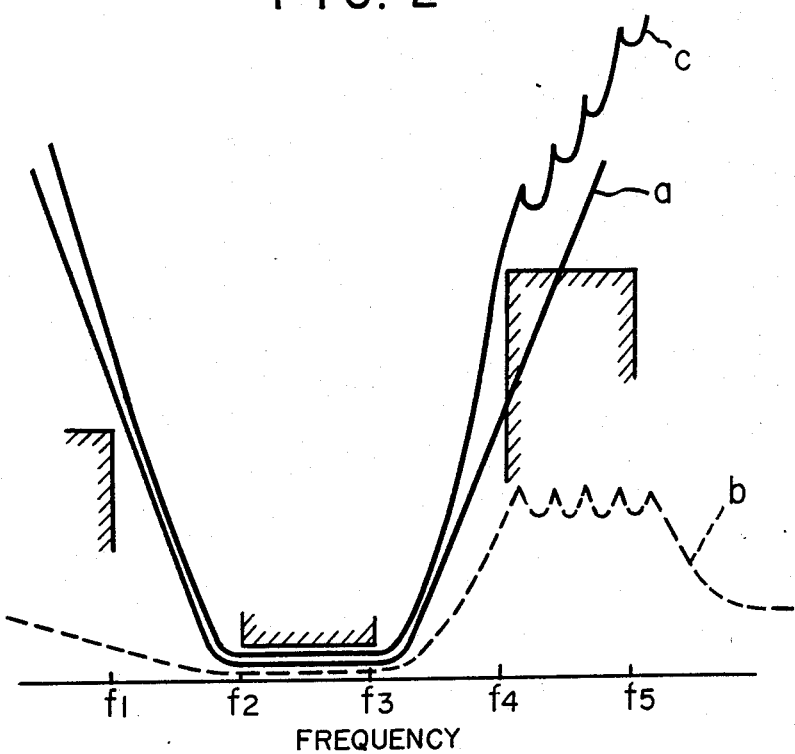
FIG. 2 shows the attenuation characteristic curves of a di-electric bandpass filter and a SAW stop filter and the resultant attenuation characteristic curve of this invention.

FIG. 2 curves (a), (b) and (c) show the attenuation characteristic curves of di-electric bandpass filter 5 and SAW stop filter 6 and the resultant attenuation characteristic curve. Frequency $f_1$ is the transmitting false local frequency, $f_2$–$f_3$ is the transmitting area, and $f_4$–$f_5$ is the receiving area. Operation of this circuit is as follows:

Two signal waves $R_x, T_x$ whose central frequencies differ from each other are input into blocks $FB_1$, $FB_2$. Di-electric bandpass filters 4 or 5 of blocks $FB_1$, $FB_2$ pass the desired wave of each block $FB_1$, $FB_2$. SAW band stop filter 3 or 6 passes the desired wave of each block $FB_1$, $FB_2$ but prevents passing of the desired wave of opposite blocks $FB_2$, $FB_1$ so that the two signal waves $R_x, T_x$ are separated or combined.

Figure 4:
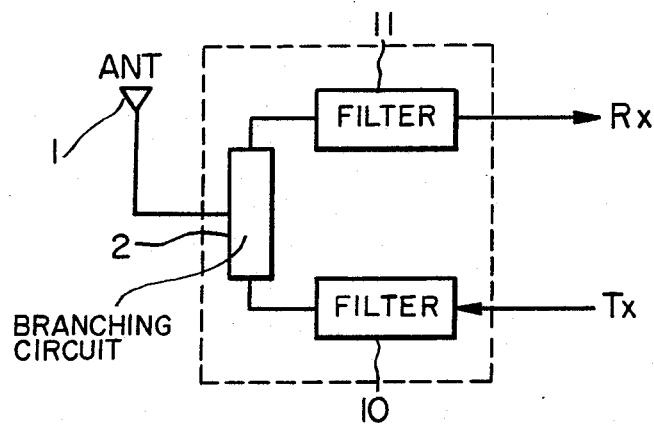
FIGS. 4 and 5 show circuits for prior art branching filters.

Generally, in a branching filter, it is necessary to have a large damping quantity for the opposite frequency area to be separated to prevent mutual interference. Prior di-electric filters as shown in FIG. 4 need multiple filters, but in this invention, a part of the damping is done in small SAW stop filters 3, 6 therefore the number of di-electric filters needed is less. A high Q is required to have a stop characteristic in the vicinity of the pass area, and a SAW band stop filter is suitable for this purpose. The insertion loss due to filtering is going to increase proportionally to the number of resonators, but a lesser number of di-electric filters are available for lowering the insertion loss.

Figure 5:
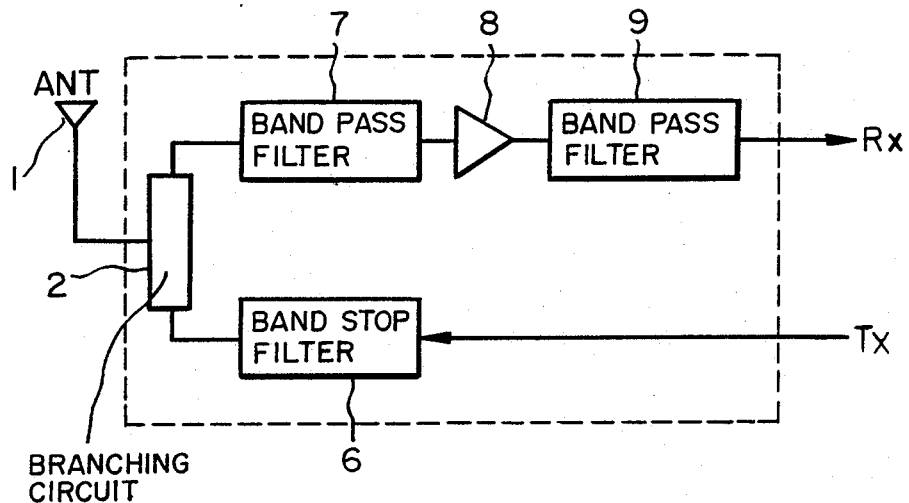

The low loss eliminates the necessity of a GaAs FET Transistor which requires greater electric current consumption and which is required in prior SAW bandpass filters 7, 9 shown in FIG. 5. Therefore, the invention causes less consumption of electric current in the receiver. Moreover, the branching filter is comprised of passive elements so that construction is simple and it may be manufactured at low cost.

Figure 3:
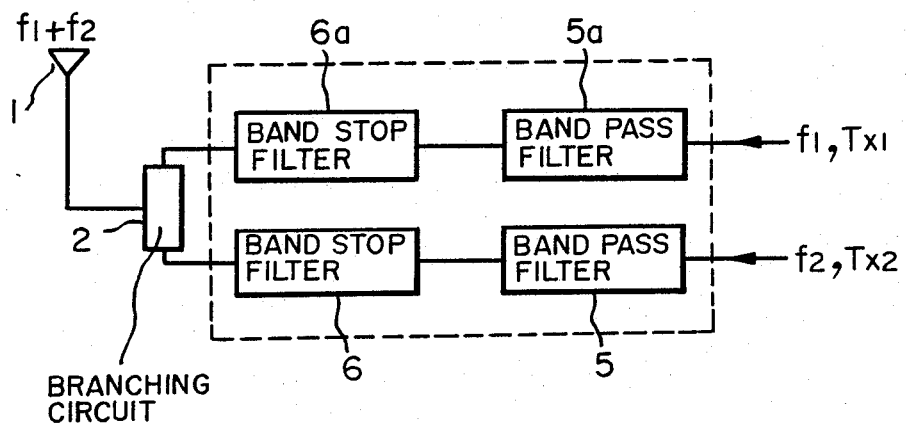
FIG. 3 shows a circuit of another embodiment for a branching filter according to this invention.

In the embodiment shown in FIG. 1, this invention is applied to separating a transmitter and receiver. As shown in FIG. 3, this invention may also be applied to combine transmitting signals $T_{x1}$, $T_{x2}$ of different frequencies $f_1$, $f_2$ from a transmitter without mutual interference and connect to a common antenna 1. In FIG. 3, filters 5(a) and 6(a) are a di-electric bandpass filter and a SAW band stop filter respectively.

In the system of FIG. 1, where a transmitting signal $T_x$, from the transmitter, has limited noise in the transmitting band area, di-electric bandpass filter 5 or SAW stop filter 6 on the transmitting side may be omitted for reasons of economy. This is a special case, but the advantages of this invention still reside in receiving filter block $FB_1$.

As explained above, in this invention the following advantages are achieved.

1. The branching filter is smaller than in the prior art which are comprised of di-electric bandpass filters 10, 11 so that radio communication equipment can be smaller.

2. The branching filter does not require a low noise high gain amplifier 8 having a GaAs FET Transistor as in the prior art branching filter comprised of SAW filters 6, 7, 9, so that of electric current consumption by radio communication equipment can be much smaller.

3. That all elements are passive elements to keep construction simple, easy to assemble and lower in cost than prior art SAW branching filters having low noise amplifier 8.

This invention is not to be limited by the embodiment shown in the drawings and described in the description which is given by way of example and not of limitation, but only in accordance with the scope of the appended claims.

What is claimed is:

1. A branching filter for radio communication equipment having a plurality of branches for separating or combining combinations of transmitted or received signals having center frequencies which differ from one another; each branch of said branching filter comprising a di-electric bandpass filter in series with a SAW band-stop filter; said di-electric bandpass filter and SAW band-stop filter constructed to pass a desired waveform while blocking desired waveforms of the other branches of said branching filter whereby said branching filter system may be kept as small as possible for use in mobile radio communications systems.

2. The branching filter according to claim 1 wherein said filter branches are signal transmission filter branches whereby multiple transmission signals may be processed and transmitted by said branching filter.

* * * * *